(12) United States Patent
Alcantara Burguete et al.

(10) Patent No.: US 8,770,672 B2
(45) Date of Patent: Jul. 8, 2014

(54) VEHICLE WHEEL END ASSEMBLIES WITH HUB BEARING SEALS

(75) Inventors: Avissai Alcantara Burguete, Mexico City (MX); Ricardo Guerrero Melendez, Mexico City (MX)

(73) Assignee: GM Global Technology Operations LLC, Detroit, MI (US)

( * ) Notice: Subject to any disclaimer, the term of this patent is extended or adjusted under 35 U.S.C. 154(b) by 324 days.

(21) Appl. No.: 12/889,909

(22) Filed: Sep. 24, 2010

(65) Prior Publication Data

US 2012/0074766 A1   Mar. 29, 2012

(51) Int. Cl.
*B60B 27/00* (2006.01)
(52) U.S. Cl.
USPC ............... 301/105.1; 301/111.03; 384/544
(58) Field of Classification Search
CPC   B60B 27/00; B60B 27/0005; B60B 27/0015; B60B 27/0073
USPC ............... 301/105.1, 111.01, 112, 111.03, 301/131–132; 384/544
See application file for complete search history.

(56) References Cited

U.S. PATENT DOCUMENTS

| | | | | |
|---|---|---|---|---|
| 4,811,992 | A * | 3/1989 | Steiner | 301/105.1 |
| 5,190,355 | A * | 3/1993 | Hobbie et al. | 301/105.1 |
| 6,286,909 | B1 * | 9/2001 | Mizukoshi et al. | 301/105.1 |
| 6,296,321 | B1 | 10/2001 | Mizukoshi et al. | |
| 7,118,182 | B2 * | 10/2006 | Kayama et al. | 301/105.1 |
| 7,597,405 | B2 * | 10/2009 | Langer et al. | 301/105.1 |
| 7,708,353 | B2 * | 5/2010 | Inoue et al. | 301/105.1 |
| 2003/0012474 | A1 * | 1/2003 | Tajima et al. | 384/544 |
| 2003/0094849 | A1 * | 5/2003 | Joki et al. | 301/105.1 |
| 2010/0301665 | A1 * | 12/2010 | White et al. | 301/105.1 |

FOREIGN PATENT DOCUMENTS

| | | |
|---|---|---|
| CN | 201231654 Y | 5/2009 |
| CN | 201382084 Y | 1/2010 |
| CN | 101163597 A | 11/2010 |
| EP | 2020309 A2 | 2/2009 |

OTHER PUBLICATIONS

German Patent and Trademark Office. German Office Action dated Dec. 20, 2012 for Patent Application No. 10 2011 083 199.1.

* cited by examiner

*Primary Examiner* — Jason Bellinger
(74) *Attorney, Agent, or Firm* — Ingrassia Fisher & Lorenz, P.C.

(57) ABSTRACT

A vehicle wheel end assembly includes a hub bearing assembly with an inner member having a first side defining a throughbore and a second side defining an inner raceway, a shaft extending through the throughbore of the inner member and configured to receive a torque and to transfer the torque to the inner member such that the inner member rotates with the shaft; and a seal positioned within the throughbore between the shaft and the inner member.

18 Claims, 4 Drawing Sheets

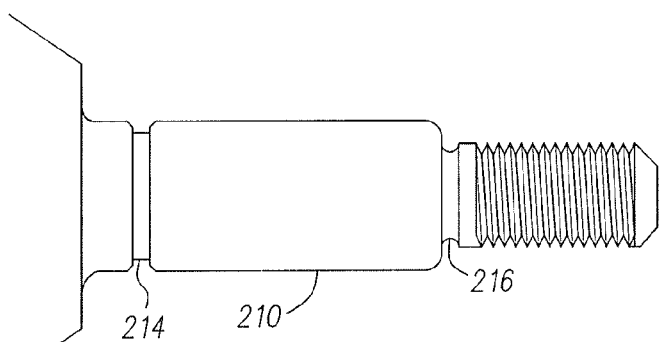
Fig. 4
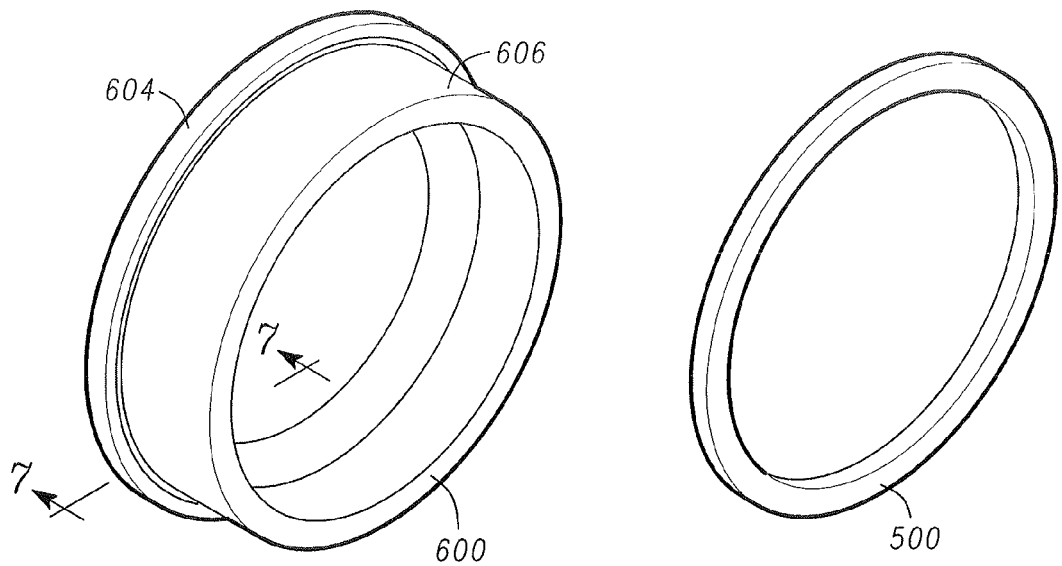
Fig. 6
Fig. 5
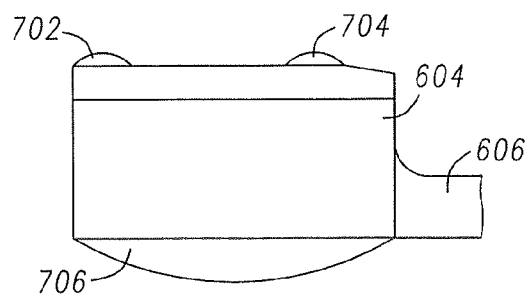
Fig. 7

VEHICLE WHEEL END ASSEMBLIES WITH HUB BEARING SEALS

TECHNICAL FIELD

The present invention generally relates to vehicle wheel end assemblies and more particularly relates to vehicle wheel end assemblies with hub bearing assemblies and half shafts.

BACKGROUND OF THE INVENTION

Most motor vehicles, including modern automobiles, have a powertrain with an engine or motor that delivers driving power through a transmission to wheel end assemblies that support and transfer torque to the wheels. The wheel end assemblies typically include a half shaft coupled to the transmission via an inboard joint and a hub bearing assembly mounted on an outboard joint. The hub bearing assembly defines a throughbore for receiving the half shaft and includes an inner member that defines an inner raceway, an outer member that defines an outer raceway, and rolling elements positioned within the raceways such that the inner member is rotatable within the outer member. A wheel hub supporting a wheel is integral with or mounted on the inner member. The half shaft extends through the throughbore of the hub bearing assembly to drive the wheel hub and the wheel.

Although current vehicle wheel end assembly designs are adequate, there is a challenge to manufacture wheel end assemblies that are more serviceable and robust. In some situations, contaminants such as dirt, water, or salt may be introduced into the wheel end assembly. Such contaminants may make it difficult to remove the bearing assembly from the half shaft during service.

Accordingly, it is desirable to provide an improved wheel end assembly. In addition, it is desirable to provide a wheel end assembly that is less prone to the introduction of contaminants. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with an exemplary embodiment, a vehicle wheel end assembly includes a hub bearing assembly with an inner member having a first side defining a throughbore and a second side defining an inner raceway, a shaft extending through the throughbore of the inner member and configured to receive a torque and to transfer the torque to the inner member such that the inner member rotates with the shaft; and a seal positioned within the throughbore between the shaft and the inner member.

In accordance with another exemplary embodiment, a method is provided for sealing a vehicle wheel end assembly having a hub bearing assembly and a half shaft. The method includes mounting a seal on a circumferential surface of the half shaft; and installing the hub bearing assembly on the half shaft such that the seal creates a first watertight interface with the hub bearing assembly and a second watertight interface with the half shaft.

DESCRIPTION OF THE DRAWINGS

The present invention will hereinafter be described in conjunction with the following drawing figures, wherein like numerals denote like elements.

FIG. 4 is a partial isomeric view of a half shaft of the wheel end assembly of FIG. 3 in accordance with the exemplary embodiment;

FIG. 5 is a partial, isometric view of an inboard seal of the wheel end assembly of FIG. 3 in accordance with an exemplary embodiment;

FIG. 6 is a partial, isometric view of an outboard seal of the wheel end assembly of FIG. 3 in accordance with an exemplary embodiment; and FIG. 7 is a partial cross-sectional view of the outboard seal taken along line 7-7 of FIG. 6 in accordance with an exemplary embodiment.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Broadly, exemplary embodiments discussed herein provide a wheel end assembly with a half shaft extending through a hub bearing assembly to drive a hub and a wheel mounted thereon. Seals may be provided between the half shaft and the inner member of the hub bearing assembly to prevent water and other contaminants from adversely impacting the hub bearing assembly or half shaft.

Figure 1:
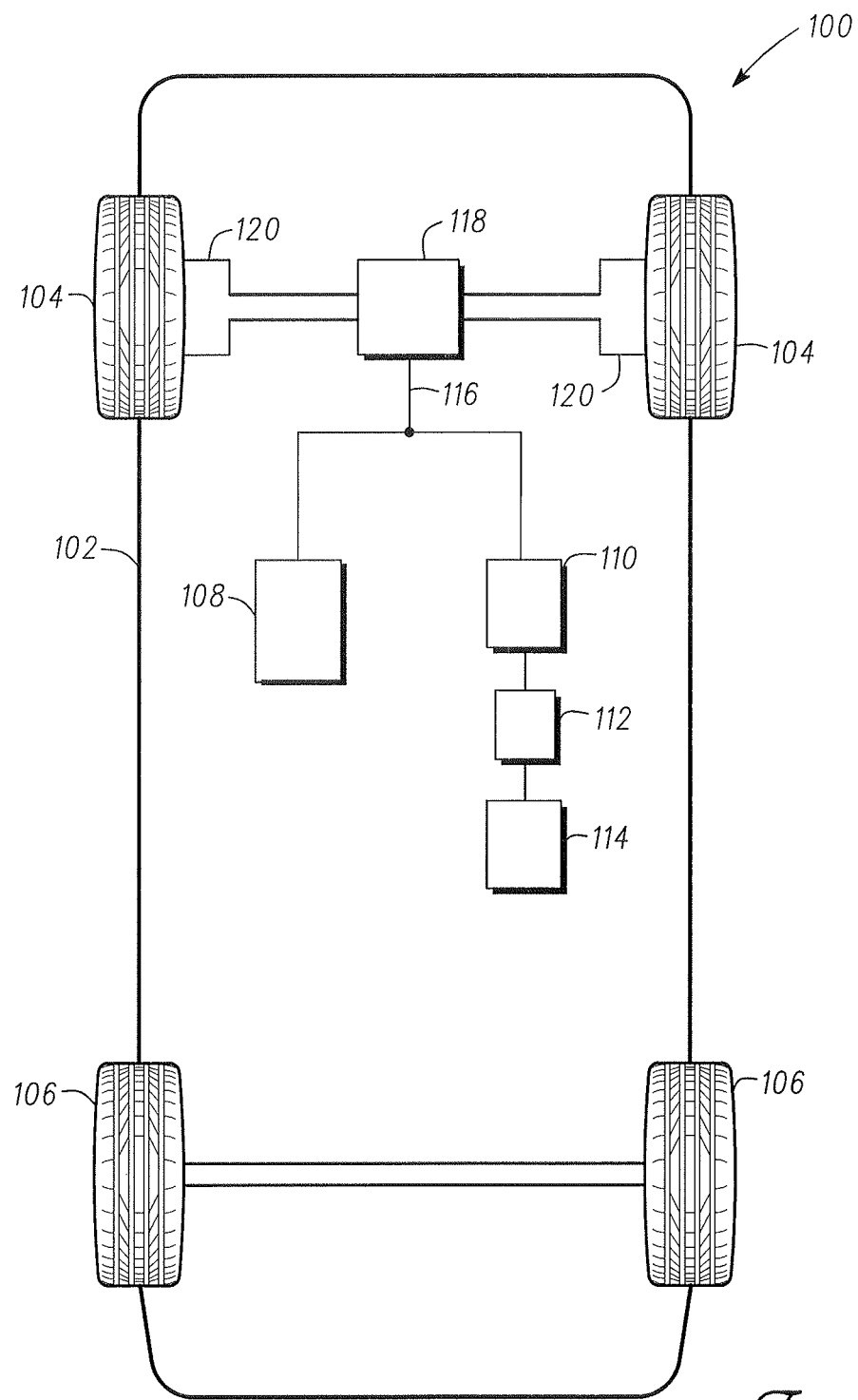
FIG. 1 is a schematic block diagram of a vehicle with a wheel end assembly in accordance with an exemplary embodiment.

FIG. 1 is a schematic block diagram of a vehicle 100 in accordance with an exemplary embodiment. The vehicle 100 includes a frame 102, two front wheels 104, two rear wheels 106, and two wheel end assemblies 120. The frame 102 may include a chassis and a body that substantially encloses the other components of the vehicle 100. The wheels 104 and 106 are each rotationally coupled to the frame 102 near a respective corner. While the front wheels 104 are shown as coupled to the frame 102 via wheel end assemblies 120, the wheel end assemblies discussed herein may also be utilized in conjunction with the rear wheels 106.

In the exemplary embodiment illustrated in FIG. 1, the vehicle 100 is a hybrid automobile, and further includes an internal combustion engine 108, an electric motor 110, an inverter 112, an electrical storage device 114, an input shaft 116, and a transmission 118. The electrical storage device 114 is coupled to the inverter 112, which is configured to supply current from the electrical storage device 114 to the electric motor 110. The internal combustion engine 108 and electric motor 110 may each transfer torque to the transmission 118 via the input shaft 116. In turn, the transmission 118 supplies torque to the wheel end assemblies 120. The wheel end assemblies 120 transfer the torque to the wheels 104 such that the wheels 104 rotate to propel the vehicle 100. The wheel end assemblies 120 are discussed in greater detail below.

In general, the vehicle 100 may be any one of a number of different types of automobiles, such as, for example, a sedan, a wagon, a truck, or a sport utility vehicle (SUV), and may be two-wheel drive (2WD), four-wheel drive (4WD) or all-wheel drive (AWD). Although the vehicle 100 is depicted with both the internal combustion engine 108 and the electric motor 110, one or both may be omitted. The vehicle 100 may incorporate any one of, or combination of, a number of different types of engines or actuators, such as, for example, a gasoline or diesel fueled combustion engine, a flex fuel vehicle (FFV) engine, a gaseous compound fueled engine, and a combustion/electric motor hybrid engine. The exemplary embodiments discussed herein are not limited to the particular motor, engine, or powertrain configuration illustrated in FIG. 1. For example, the engine 108 may be any of numerous forms of engines readily adaptable to provide power to the transmission 118 at a range of operating speeds, for example, from idle, at or near 600 revolutions per minute (RPM), to over 6,000 RPM. Although not shown, various sensors, automotive control modules, electronic control units (ECUs), and other vehicle components may be provided.

Figure 2:
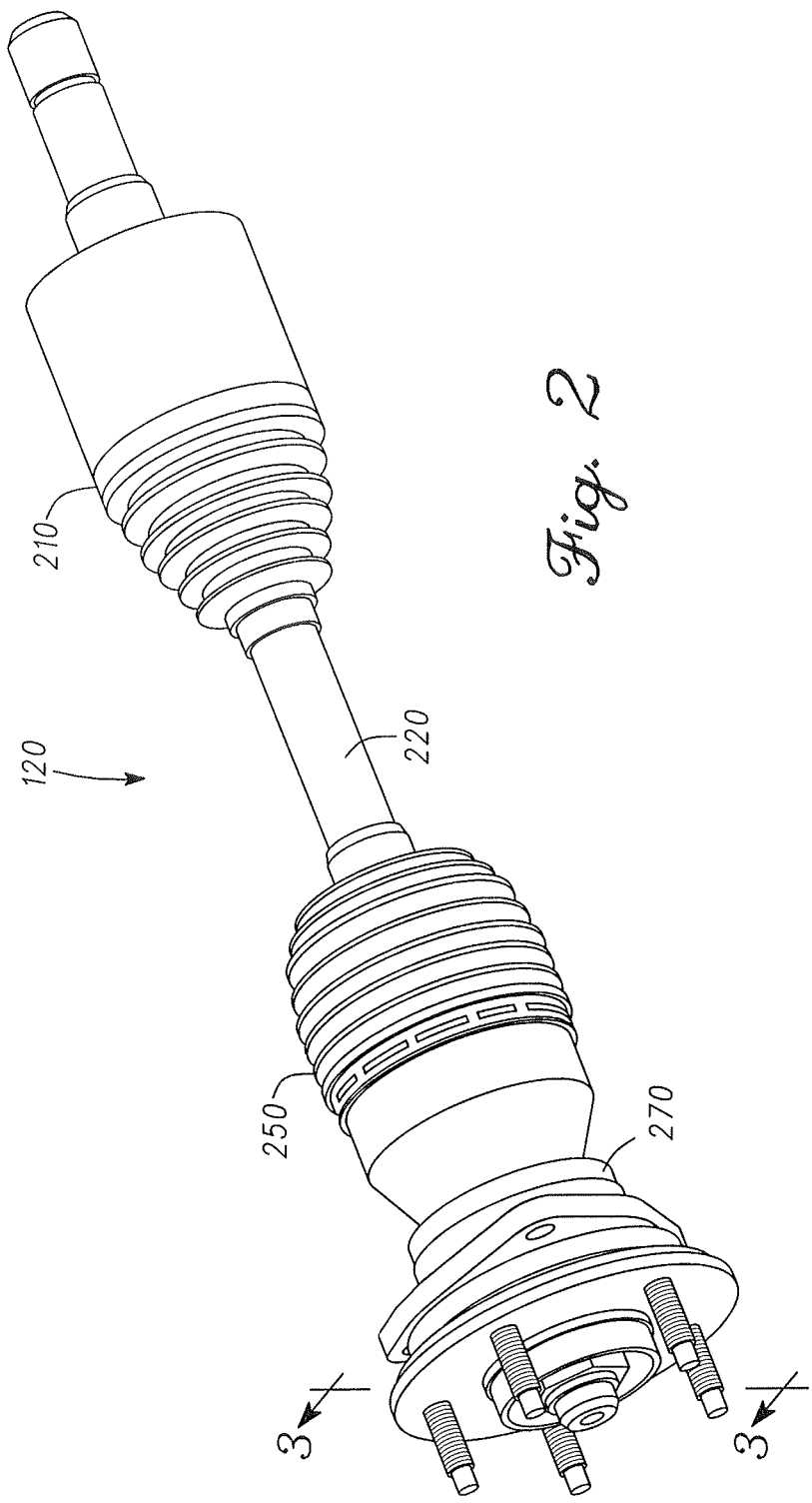
FIG. 2 is an isometric view of the wheel end assembly of FIG. 1 in accordance with an exemplary embodiment.

FIG. 2 is an isometric view of a wheel end assembly 120, such as one of the wheel end assemblies 120 of FIG. 1, in accordance with an exemplary embodiment. On an inboard side (i.e., closer to the center or longitudinal axis of the vehicle 100 in FIG. 1), the wheel end assembly 120 includes an inboard joint 210 that is coupled to the transmission 118 (FIG. 1). The inboard joint 210 transfers the torque to a half shaft 220, which extends through an outboard joint 250 and a hub bearing assembly 270. The wheels 104 (not shown in FIG. 2) are mounted on the hub bearing assembly 270 and are driven by the half shaft 220. The inboard joint 210, half shaft 220, outboard joint 250, and hub bearing assembly 270 may also collectively be referred to as a driveline or final drive system and include any suitable additional components. Although the wheel end assembly 120 is depicted with a half shaft 220, any type of drive shaft for a driven or non-driven wheel end, such as a stub shaft, may be provided. In addition to connecting the half shaft 220 to the wheel end assembly 120, the outboard joint 250 is adapted to allow angular deflection between the wheel end assembly 120 and the half shaft 220, such as in a constant velocity joint.

Figure 3:
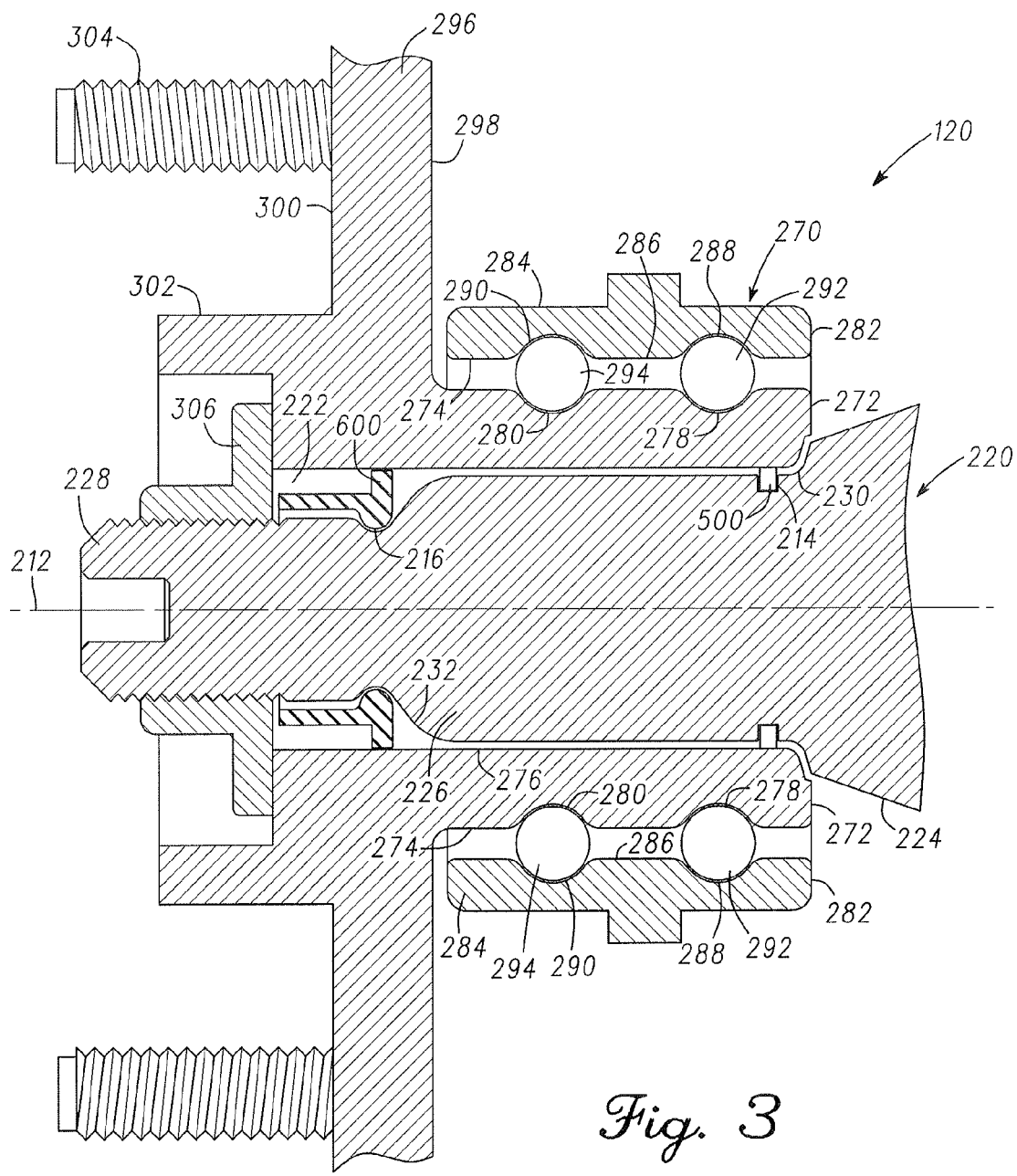
FIG. 3 is a cross-sectional view of the wheel end assembly taken along line 3-3 in FIG. 2.

FIG. 3 is a cross-sectional view of the wheel end assembly 120 taken along line 3-3 in FIG. 2. The hub bearing assembly 270 is generally cylindrical and mounted on the half shaft 220, as discussed below. The hub bearing assembly 270 is formed by an inner member 272 and an outer member 282. The outer member 282 has a first side 284 and a second side 286. The first side 284 may be coupled to a steering knuckle (not shown) or otherwise coupled to the frame 102 (FIG. 1) of the vehicle 100 (FIG. 1) to support the hub bearing assembly 270 and wheel end assembly 120. The second side 286 of the outer member 282 defines one or more outer raceways 288, 290. In the depicted embodiment, the outer raceways 288, 290 include an inboard outer raceway 288 and an outboard outer raceway 290.

The inner member 272 of the hub bearing assembly 270 has a first side 274 that defines one or more inner raceways 278, 280, such an inboard inner raceway 278 and an outboard inner raceway 280. Roller elements 292, two of which are shown, are positioned in the inboard inner raceway 278 and the inboard outer raceway 288. Similarly, roller elements 294, two of which are shown, are positioned in the outboard inner raceway 280 and the outboard outer raceway 290. The roller elements 292, 294, inner member 272, and outer member 282 cooperate such that the inner member 272 rotates about a longitudinal axis 212 within the outer member 282, as discussed in greater detail below. Although not shown, the hub bearing assembly 270 may include one or more cages to axially retain the roller elements 292, 294. Additionally, although the roller elements 292, 294 are depicted as ball bearings, other bearing structures may be used, including tapered bearings or roller bearings.

A hub 296 in the form of a radial flange or disk is coupled to or integral with the inner member 272. The hub 296 has an inboard face 298 that extends proximate to the inner member 272 and an opposing outboard face 300. A piloting flange 302 extends from the outboard face 300 in a radial direction. A plurality of wheel studs 304 also extend from the outboard face 300. The piloting flange 302 and wheel studs 304 are adapted to engage and support a wheel (not shown) on the hub 296 for rotation about the longitudinal axis 212. Although not shown, the hub 296 may be associated with a wheel brake (not shown).

As noted above, the half shaft 220 extends through the hub bearing assembly 270. Although not shown, the half shaft 220 may include first and second longitudinal portions coupled together by a spline. Any suitable arrangement of the half shaft 220 may be provided. More specifically, second side 276 of the inner member 272 of the hub bearing assembly 270 defines a throughbore 222 that receives and engages the half shaft 220. In the depiction of FIG. 3, the half shaft 220 includes a bell portion 224, a body portion 226, and a reduced diameter portion 228. The bell portion 224 extends in an outboard direction from the outboard joint 250 (FIG. 2) and transitions into the body portion 226 at a first transition 230. The body portion 226 transitions into the reduced diameter portion 228 at a second transition 232. In one exemplary embodiment, the throughbore 222 is defined by a polygonal-shape that engages a corresponding polygonal shape of the body portion 226 of the half shaft 220 such that the inner member 272 is rotationally locked with the half shaft 220.

A threaded fastener 306 is mounted on the half shaft 220 by engaging corresponding threads on the reduced diameter portion 228. In one exemplary embodiment, the threaded fastener 306 and the bell portion 224 of the half shaft 220 maintain the axial position of the hub bearing assembly 270 relative to the half shaft 220 in inboard and outboard axial directions.

The wheel end assembly 120 further includes one or more seals 500, 600 that are positioned within the throughbore 222 between the half shaft 220 and the inner member 272 of the hub bearing assembly 270. In the depicted embodiment, a first or inboard seal 500 is positioned to form a sealing interface between the half shaft 220 and the inner member 272 in an area proximate to the transition 230. A first groove 214 may be provided in the half shaft 220 to accommodate and provide a secure coupling between the half shaft 220 and the inner member 272. A second or outboard seal 600 is positioned to form a sealing interface between the half shaft 220 and the inner member 272 in an area proximate to the transition 232. A second groove 216 may be provided in the half shaft 220 to accommodate and provide a secure coupling between the half shaft 220 and the inner member 272. FIG. 4 is a partial perspective view of the half shaft and more clearly illustrates the position of the grooves 214, 216.

Referring again to FIG. 3, the inboard and outboard seals 500, 600 function to prevent the intrusion of dirt, water, salt, and other contaminants, particularly in the area between the body portion 226 of the half shaft 220 and the inner member 272, e.g., axially between the inboard and outboard seals 500, 600. Since this is the area of primary torque transfer between the hub bearing assembly 270 and the half shaft 220, the clearance in this portion of the wheel end assembly 120 is usually small, and therefore, may be particularly susceptible to the impact of contaminants, including possible interference with operation and service. For example, the arrangement of the inboard and outboard seals 500, 600 may prevent rust or other degradation of the interface between the half shaft 220 and the hub bearing assembly 270. Unless prevented, contaminants may result in the half shaft 220 and hub bearing assembly 270 fusing together in areas at such close proximity, thereby making separation for service difficult. The seals 500, 600 are discussed in greater detail below with reference to FIGS. 5 and 6.

Accordingly, during operation, the half shaft 220 receives a torque from the transmission 118 (FIG. 1). The half shaft 220 engages the hub bearing assembly 270 to transfer the torque to the hub 296 and wheel (not shown) mounted thereon. Inboard and outboard seals 500, 600 are mounted on and rotate with the half shaft 220 to prevent contaminant intrusion in the areas between the half shaft 220 and the inner member 272 of the hub bearing assembly 270.

During service, the hub bearing assembly 270 and/or half shaft 220 may be separated by removing the threaded fastener 306 and sliding the hub bearing assembly 270 off the half shaft 220 in an outboard direction. The seals 500, 600 ensure that the hub bearing assembly 270 is easily detachable from the half shaft 220 without damage to the half shaft 220, the hub bearing assembly 270, or service tools.

Generally, the half shaft 220 and hub bearing assembly 270 are made of materials such as steel, steel alloy, cast iron, aluminum, or aluminum alloy. Such materials provide strength to the wheel end during torque transfer and allow a reduction of mass and volume. However, any other suitable material may be used.

FIG. 5 is a partial, isometric view of the inboard seal 500 illustrated in FIG. 3. Referring to both FIG. 3 and FIG. 5, the inboard seal 500 has a rectangular cross-sectional shape, although other shapes may be provided, including a circular cross-sectional shape. As a result of the cooperation with the groove 214, the inboard seal 500 is prevented from relative movement with the inner member 272 or half shaft 220. The groove 214 may be machined into the half shaft 220 to properly locate the inboard seal 500 during installation or service to prevent subsequent contaminant intrusion.

The dimensions of the inboard seal 500 may be any suitable dimension to facilitate installation and to create generally watertight interfaces between the seal 500 and the hub bearing assembly 270 and between the seal 500 and the half shaft 220 in the operating environment of the vehicle 100. In one exemplary embodiment, the inboard seal 500 may be rubber or plastic. Factors such as temperature, pressure, material, manufacturing, and cost may be design considerations.

FIG. 6 is a partial, isometric view of an outboard seal 600 illustrated in FIG. 3. Referring to both FIG. 3 and FIG. 6, the inboard seal 600 may have any suitable cross-sectional shape. As shown, the outboard seal 600 may be embodied as a grommet with an axial flange 604 and a radial flange 606.

In the arrangement of FIG. 3, the axial flange 604 is arranged in an outboard direction and the radial flange 606 is positioned to abut the half shaft 220. Like the inboard seal 500 of FIG. 5, the dimensions of the outboard seal 600 may be any suitable dimension to facilitate installation and to create generally watertight interfaces between the seal 600 and the hub bearing assembly 270 and between the seal 600 and the half shaft 220 in the operating environment of the vehicle 100. In one exemplary embodiment, the outboard seal 600 may be metal. Factors such as temperature, pressure, material, manufacturing, and cost may be design considerations. As a result of the cooperation with the groove 216, the outboard seal 600 is prevented from relative movement with the inner member 272 or half shaft 220. The groove 216 may be machined into the half shaft 220 to properly locate the outboard seal 600 during installation or service to prevent subsequent contaminant intrusion.

FIG. 7 is a partial cross-sectional view of the outboard seal 600 taken along line 7-7 of FIG. 6 and particularly shows first and second outer circumferential beads 702 and 704 that extend axially outwardly from the axial flange 604 to provide a secure sealing arrangement with the inner member 272. FIG. 7 also illustrates an inner circumferential bead 706 that is positioned within the groove 216 (FIG. 3) to provide a secure sealing arrangement with the half shaft 220.

Although the wheel end assemblies discussed above are reference with respect to vehicles, other exemplary embodiments may be used in any bearing context that operates in a high contamination environment. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vehicle wheel end assembly, comprising:
   a hub bearing assembly comprising an inner member having a first side defining a throughbore, and a second side opposite the first side and defining an inner raceway,
   a shaft extending through the throughbore of the inner member and configured to receive a torque and to transfer the torque to the inner member such that the inner member rotates with the shaft, the shaft having a circumferential surface;
   a first seal positioned within the throughbore directly engaging the circumferential surface of the shaft and the first side of the inner member such that the first seal is rotatably fixed relative to the circumferential surface of the shaft and rotates with the inner member and the shaft; and
   a second seal positioned within the throughbore directly engaging the circumferential surface of the shaft and the first side of the inner member such that the second seal is rotatably fixed relative to the circumferential surface of the shaft and rotates with the inner member and the shaft.

2. The vehicle wheel end assembly of claim 1, wherein the hub bearing assembly further comprises an outer member having a first side defining an outer raceway, the outer member extending from an outboard end to an inboard end, and a roller element positioned within the inner raceway and the outer raceway such that the inner member is rotatable relative to the outer member, and wherein the first seal is positioned axially between the inboard end and the outboard end of the outer member.

3. The vehicle wheel end assembly of claim 1, wherein the shaft has a circumferential surface and the first seal extends about the circumferential surface of the shaft.

4. The vehicle wheel end assembly of claim 1, wherein the shaft is a half shaft.

5. The vehicle wheel end assembly of claim 1, wherein the first seal creates a first watertight interface with the shaft and a second watertight interface with the inner member.

6. The vehicle wheel end assembly of claim 1, wherein the first seal is an O-ring.

7. The vehicle wheel end assembly of claim 1, wherein the first seal has a rectangular cross-section.

8. The vehicle wheel end assembly of claim 1, wherein the second seal is a grommet.

9. The vehicle wheel end assembly of claim 1, wherein the second seal comprises an axial flange and a radial flange in cross-section.

10. The vehicle wheel end assembly of claim 1, wherein the first seal is an inboard seal and the second seal is an outboard seal.

11. The vehicle wheel end assembly of claim 10, wherein the inboard seal is an O-ring and the outboard seal is a grommet.

12. The vehicle wheel end assembly of claim 10, wherein the half shaft defines a first groove for receiving the inboard seal and a second groove for receiving the outboard seal.

13. The vehicle wheel end assembly of claim 1, wherein the shaft includes a body portion that engages the inner member, and wherein the first seal and the second seal are configured to seal an area between the body portion and the inner member.

14. A method for sealing a vehicle wheel end assembly having a hub bearing assembly and a half shaft, comprising the steps of:
mounting a first seal directly on a circumferential surface of the half shaft;
mounting a second seal directly on a circumferential surface of the half shaft; and
installing the hub bearing assembly on the half shaft such that the first seal creates a first watertight interface with the hub bearing assembly and a second watertight interface with the half shaft and such that the second seal creates a third watertight interface with the hub bearing assembly and a fourth watertight interface with the half shaft, wherein the first seal, the half shaft, and the hub bearing assembly are rotatably fixed relative to one another and wherein the second seal, the half shaft, and the hub bearing assembly are rotatably fixed relative to one another.

15. The method of claim 14, wherein the mounting step includes mounting an O-ring on the half shaft as the first seal.

16. The method of claim 14, wherein the mounting step includes mounting a grommet on the half shaft as the second seal.

17. The method of claim 14, wherein the step of mounting the first seal includes mounting an O-ring on the half shaft and the step of mounting the second seal includes mounting a grommet on the half shaft.

18. A vehicle wheel end assembly, comprising:
a hub bearing assembly comprising:
an inner member having a first side defining a throughbore and a second side opposite the first side and defining an inner raceway,
an outer member having a first side defining an outer raceway, and
a roller element positioned within the inner raceway and the outer raceway such that the inner member is rotatable relative to the outer member;
a half shaft including a body portion extending through the throughbore of the inner member and engaging the inner member to transfer torque, the body portion having an inboard side and an outboard side;
an O-ring configured to form a first seal between the half shaft and the first side of the inner member at the inboard side of the body portion by directly engaging the half shaft and the first side of the inner member such that the O-ring, the half shaft, and the inner member are fixed relative to one another during rotation; and
a grommet configured to form a second seal between the half shaft and the first side of the inner member at the outboard side of the body portion by directly engaging the half shaft and the first side of the inner member such that the grommet, the half shaft, and the inner member are fixed relative to one another during rotation.

* * * * *